US011974112B2

(12) United States Patent
Yang et al.

(10) Patent No.: US 11,974,112 B2

(45) Date of Patent: Apr. 30, 2024

(54) DAMPER AND SOUND-PRODUCING DEVICE

(71) Applicant: Goertek Inc., Shandong (CN)

(72) Inventors: Jianbin Yang, Weifang (CN); Shousong Qiang, Weifang (CN); Chunfa Liu, Weifang (CN)

(73) Assignee: Goertek Inc., Shandong (CN)

( * ) Notice: Subject to any disclaimer, the term of this patent is extended or adjusted under 35 U.S.C. 154(b) by 188 days.

(21) Appl. No.: 17/773,228

(22) PCT Filed: Nov. 5, 2020

(86) PCT No.: PCT/CN2020/126828

§ 371 (c)(1),
(2) Date: Apr. 29, 2022

(87) PCT Pub. No.: WO2021/088934

PCT Pub. Date: May 14, 2021

(65) Prior Publication Data

US 2022/0377465 A1 Nov. 24, 2022

(30) Foreign Application Priority Data

Nov. 8, 2019 (CN) ........................ 201911089343.9

(51) Int. Cl.

*H04R 25/00* (2006.01)
*H04R 7/04* (2006.01)

(Continued)

(52) U.S. Cl.

CPC ................. *H04R 9/06* (2013.01); *H04R 7/04* (2013.01); *H04R 9/046* (2013.01)

(58) Field of Classification Search

CPC ...... H04R 2400/11; H04R 9/043; H04R 9/06; H04R 9/02; H04R 9/04

(Continued)

(56) References Cited

U.S. PATENT DOCUMENTS

| | | | | |
|---|---|---|---|---|
| 5,757,945 A * | 5/1998 | Sakamoto | H04R 9/06 | 381/400 |
| 7,515,727 B2 * | 4/2009 | Watanabe | H04R 31/006 | 381/409 |

(Continued)

FOREIGN PATENT DOCUMENTS

| | | |
|---|---|---|
| CN | 208112932 U | 11/2018 |
| CN | 110418258 A | 11/2019 |

*Primary Examiner* — Phylesha Dabney

(74) *Attorney, Agent, or Firm* — Baker Botts LLP

(57) ABSTRACT

Disclosed are a damper and a sound-producing device. The damper includes a first connecting part, a planar elastic part and a second connecting part. One side of the first connecting part is cooperatively connected to a voice coil; an end of the first connecting part is bent and extends toward the other side of the first connecting part to form the planar elastic part, the planar elastic part and the first connecting part being in the same plane; the second connecting part is connected to one end of the planar elastic part away from the first connecting part and is configured to be fixedly connected; the damper is of a line-like shape formed by winding of a metal wire, a Young's modulus of a wire rod of the metal wire is 0.7e11 pa to 3e11 pa, a mechanical stiffness Kms of a wire rod of the metal wire is 0.2 N/mm to 2 N/mm.

18 Claims, 10 Drawing Sheets

(51) Int. Cl.
*H04R 9/04* (2006.01)
*H04R 9/06* (2006.01)

(58) Field of Classification Search
USPC .......................................................... 381/150
See application file for complete search history.

(56) References Cited

U.S. PATENT DOCUMENTS

| | | | | |
|---|---|---|---|---|
| 9,942,680 | B1 * | 4/2018 | Little | H04R 31/006 |
| 10,863,257 | B1 * | 12/2020 | Pierce | H04R 1/06 |
| 2005/0111689 | A1 * | 5/2005 | True | H04R 31/006 381/423 |
| 2017/0339478 | A1 * | 11/2017 | Xiao | H04R 9/025 |
| 2019/0149924 | A1 * | 5/2019 | Cheng | H04R 9/025 381/412 |
| 2022/0377463 | A1 * | 11/2022 | Yang | H04R 9/025 |
| 2022/0377464 | A1 * | 11/2022 | Yang | H04R 31/006 |
| 2022/0377465 | A1 * | 11/2022 | Yang | H04R 9/046 |
| 2022/0386034 | A1 * | 12/2022 | Yang | H04R 9/043 |
| 2022/0394390 | A1 * | 12/2022 | Yang | H04R 9/06 |
| 2022/0408192 | A1 * | 12/2022 | Yang | H04R 9/043 |
| 2022/0417664 | A1 * | 12/2022 | Hsu | H05K 1/0277 |
| 2023/0199393 | A1 * | 6/2023 | Chen | H04R 9/045 381/430 |
| 2023/0232157 | A1 * | 7/2023 | Liu | H04R 9/043 381/400 |
| 2023/0239631 | A1 * | 7/2023 | Liu | H04R 9/046 381/412 |

* cited by examiner b: A Sound-producing Device Installed with a Prior Art Damper: Resonant Frequency F0 =195Hz
c: A Sound-producing Device Installed with the Damper of the Present Disclosure: Resonant Frequency F0=170Hz b: A Sound-producing Device Installed with a Prior Art Damper
c: A Sound-producing Device Installed with the Damper of the Present Disclosure

DAMPER AND SOUND-PRODUCING DEVICE

CROSS-REFERENCE TO RELATED APPLICATIONS

This application is a National Stage of International Application No. PCT/CN2020/126828, filed on Nov. 5, 2020, which claims priority to Chinese Patent Application No. 201911089343.9, filed on Nov. 8, 2019, both of which are hereby incorporated by reference in their entireties.

TECHNICAL FIELD

The present disclosure relates to the technical field of electro-acoustic conversion, and more particularly, to a damper and a sound producing device.

BACKGROUND

With the rapid development of science and technology, audio equipment is becoming more and more popular. Demands on audio equipment are not only limited to audio playback, but also increasingly put forward on reliability of audio equipment. In audio equipment, a sound-producing device is a commonly used electronic component which is mainly used for the playback of audio signals, and its reliability directly influences the function of the audio equipment with a sound-producing device.

A damper is one of the basic components of a sound-producing device, and functions mainly to ensure the correct position of the voice coil in the magnetic gap so that the vibration system reciprocates only in the axial direction when the voice coil is under force, and to provide elastic force for reciprocating motion of the vibration system. A damper in the prior art exhibits a corrugated shape which undulates in the axial direction thereof, and is made of fibrous materials. Damper of such structures and materials suffer from large space occupation in the height direction of the sound-producing device. In addition, due to material restrictions, it is difficult to make the Kms (mechanical stiffness) of the damper very small; as such, when the sound-producing device is under large vibration displacement, the compliance provided by the damper becomes poor, and it is difficult to reduce the F0 of the speaker unit. What is more, existing dampers are prone to deformation and hardness variation in a high temperature and high humidity environment, and are of poor resistance against fatigue.

In view of this, it is necessary to provide a new technical solution to solve the above technical problems.

SUMMARY

An object of the present disclosure is to provide a new technical solution for a damper and a sound-producing device.

According to one aspect of the present disclosure, there is provided a damper which includes:

a first connecting part, one side of which is configured to cooperatively connect to a voice coil of the sound-producing device;

a planar elastic part, which is formed by an end of the first connecting part being bent and extending toward the other side of the first connecting part, the planar elastic part and the first connecting part being in the same plane; and a second connecting part, which is connected to one end of the planar elastic part away from the first connecting part, and is configured to be fixedly connected in the sound-producing device:

wherein the damper is of a line-like shape formed by winding of a metal wire, a Young's modulus of a wire rod of the metal wire is 0.7e11 pa to 3e11 pa, and a mechanical stiffness Kms of a wire rod of the metal wire is 0.2 N/mm to 2 N/mm.

Optionally, a width of the planar elastic part gradually increases along a direction from the first connecting part to the second connecting part, with extension lines of two sides of the planar elastic part in its width direction intersecting at a point in a direction in which the first connecting part faces away from the second connecting part and forming an acute angle.

Optionally, the acute angle is no less than 10°.

Optionally, the acute angle is greater than 20.

Optionally, each bending of the planar elastic part constitutes a bending track, and a number of bending tracks is no less than 3.

Optionally, each bending of the planar elastic part constitutes a bending track; and an interval between two adjacent bending tracks is no greater than 1.5 mm.

Optionally, an interval between two adjacent bending tracks is greater than a wire diameter of the metal wire of the damper.

Optionally, the wire diameter of the metal wire of the damper is 0.2 mm to 0.5 mm.

Optionally, the wire diameter of the metal wire of the damper is 0.3 mm to 0.4 mm.

Optionally, the first connecting part, the planar elastic part and the second connecting part are integrally formed.

Optionally, there is provided one planar elastic part which is formed by one end of the first connecting part being bent and extending in an S shape.

Optionally, there are provided two planar elastic parts which are formed by both ends of the first connecting part being bent and extending in an S shape respectively.

Optionally, the first connecting part is in the shape of an arc between the two planar elastic parts.

Optionally, the first connecting part is in the shape of a broken line between the two planar elastic parts.

Optionally, one end of the planar elastic part away from the first connecting part is bent into a hook structure to form the second connecting part.

According to another aspect of the present disclosure, there is provided a sounding-producing device, including:

a vibration system, comprising a combination of a diaphragm, a voice coil, a voice coil bobbin and the damper as mentioned above;

a magnetic circuit system having a magnetic gap in which the voice coil is suspended; and a casing, configured to house the vibration system and the magnetic circuit system;

wherein the voice coil is wound on the voice coil bobbin, the diaphragm is connected to one end of the voice coil bobbin, the first connecting part of the damper is connected to an outer side wall of the voice coil bobbin or to a root region of the voice coil, and the second connecting part of the damper is fastened to the casing.

One technical effect of the present disclosure is that, by providing a damper of a planar structure and made of metal material, a lot of space for the sound-producing device is saved, and manufacturing of a miniature sound-producing device is facilitated. Further, the damper of the present disclosure is made of metal material. Compared with prior art materials such as fiber, the damper of the present disclosure may have a smaller Kms, such that it can provide better compliance under large displacement vibration and reduce the F0 of the sound-producing device. Moreover, the damper of the present disclosure is less prone to the influences of a high-temperature, high humidity environment, and has excellent resistance against fatigue.

Other features and advantages of the present disclosure will become apparent from the following detailed description of exemplary embodiments of the present disclosure with reference to the accompanying drawings.

BRIEF DESCRIPTION OF THE DRAWINGS

The accompanying drawings, which are incorporated into this specification and constitute a part thereof, illustrate embodiments of the present disclosure and, together with the description, serve to explain the principles of the present disclosure.

DETAILED DESCRIPTION

Figure 1:
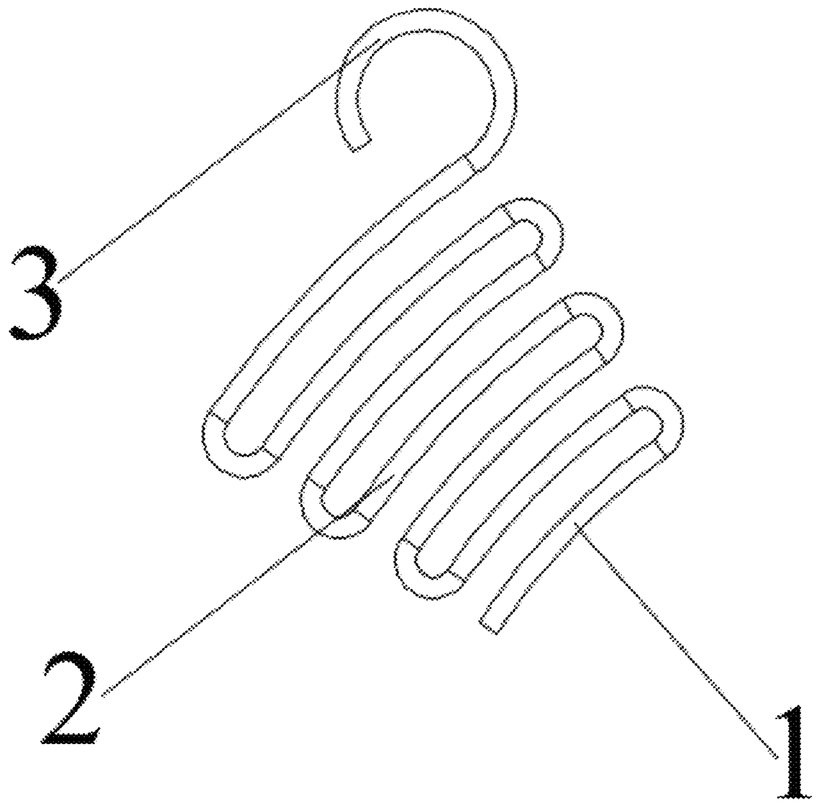
FIG. 1 is a Schematic Illustration 1 of the front view structure of a damper of the present disclosure.

Various exemplary embodiments of the present disclosure will now be described in detail with reference to the accompanying drawings. It is to be noted that unless otherwise specified, relative arrangement, numerical expressions and numerical values of components and steps illustrated in these embodiments do not limit the scope of the present disclosure.

Description to at least one exemplary embodiment is in fact illustrative only, and is in no way limiting to the present disclosure or application or use thereof.

Techniques, methods and devices known to those skilled in the prior art may not be discussed in detail; however, the techniques, methods and devices shall be regarded as part of the description where appropriate.

In all the illustrated and discussed examples, any specific value shall be explained as only exemplary rather than restrictive. Thus, other examples of exemplary embodiments may have different values.

It is to be noted that similar reference numbers and alphabetical letters represent similar items in the drawings below, such that once a certain item is defined in a drawing, further discussion thereon in the subsequent drawings is no longer necessary.

Referring to FIGS. 1 to 5, an embodiment of the present disclosure provides a damper which includes a first connecting part 1, a planar elastic part 2 and a second connecting part 3. One side of the first connecting part 1 is configured to cooperatively connect to a voice coil of the sound-producing device; an end of the first connecting part 1 is bent and extends in an S shape toward the other side of the first connecting part to form the planar elastic part 2, the planar elastic part 2 and the first connecting part 1 being in the same plane; the second connecting part 3 is connected to one end of the planar elastic part 2 away from the first connecting part 1, and the second connecting part 3 is configured to be fixedly connected in the sound-producing device; and the damper is of a line-like shape formed by winding of a metal wire, a Young's modulus of a wire rod of the metal wire is 0.7e11 pa to 3e11 pa, and a mechanical stiffness Kms of a wire rod of the metal wire is 0.2 N/mm to 2 N/mm.

A damper in the prior art is a loop-shaped structure as a whole, which is formed into a corrugated shape which undulates in the axial direction thereof. A damper in the prior art is typically installed between the magnetic circuit system and vibration diaphragm of the sound-producing device, and is usually connected to the outer side wall of the voice coil bobbin. During vibration, the damper needs to occupy a certain space in the axial direction, and therefore it is difficult to manufacture a sound-producing device with a very small height. In an embodiment of the present disclosure a novel damper is designed, where the planar elastic part 2 and the first connecting part 1 are located in the same plane. When the damper of the present disclosure is installed on the sound-producing device, it occupies a relatively small space in the height direction, saving a lot of space for the sound-producing device and facilitating manufacturing of a compact sound-producing device. Further, the damper of the embodiment of the present disclosure is a line-like structure formed by integrally winding, and this molding method is easy to operate in terms of technology and easy to produce and process.

In one embodiment, the first connecting part 1, the planar elastic part 2 and the second connecting part 3 are all made of metal material. In one embodiment, the metal material is any one of phosphor bronze, iron, steel or alloy material.

A damper in the prior art is typically made of fibrous materials, such as CONEX (meta-aramid), blended material and cloth. A damper made in this way has poor compliance under large displacement vibration of the sound-producing device, and tends to deform in a high temperature and high humidity environment; the hardness thereof is likely to variate, leading to a poor fatigue resistance. By contrast, the damper of the present disclosure is made of metal material. On one hand, it can provide better compliance under large displacement vibration, and is less influenced by high temperature and high humidity environment, and has excellent fatigue resistance. On the other hand, since the damper is made of metal material, it can realize electricity conduction, and thus the conduction between the internal and external circuits thereof can be realized by means of the damper structure itself without a separate lead wire, thereby saving the space reserved in the vertical direction for the wiring of the lead wire, facilitating to the manufacturing of a thinner and lighter sound-producing device. Test has proved that it is possible to select any of phosphor bronze, iron wire, steel wire and alloy wire for the metal material of the damper. Of course, these several materials are only available materials verified by the skilled person through limited experiments, and are not intended to limit the present disclosure.

Further, the damper is of a line-like shape formed by winding of a metal wire, a Young's modulus of a wire rod of the metal wire is 0.7e11 pa to 3e11 pa. When the Young's modulus of the metal wire is in this numerical range, the metal wire has excellent resistance against deformation and good fatigue resistance, and can provide a good cushioning effect for the diaphragm of the sound-producing device. After testing, it is found that if the Young's modulus of the metal wire is lower than 0.7e11 pa, a damper produced therewith may be plastically deformed and damaged when the sound-producing device undergoes large displacement vibration; If the Young's modulus is higher than 3e11 pa, the produced damper will be of a high rigidity and cannot provide a good cushioning effect for the diaphragm in the sound-producing device.

Further, a mechanical stiffness Kms of the metal wire is 0.2N % mm to 2 N/mm. This parameter setting further ensures that the damper can provide not only sufficient cushioning effect for the diaphragm of the sound-producing device, but also refrains from damages due to plastic deformation under large displacement vibrations.

Figure 4:
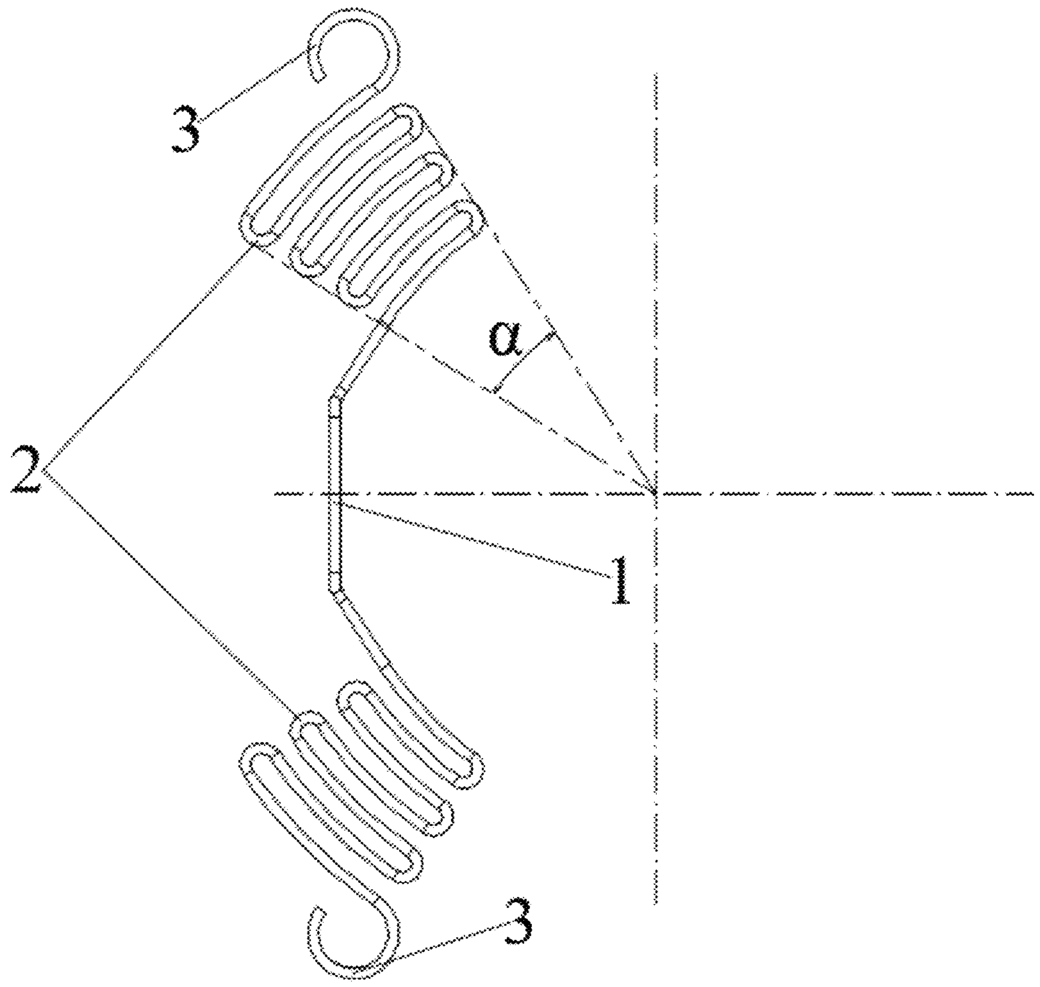
FIG. 4 is a Schematic Illustration 3 of the front view structure of a damper of the present disclosure.

In one embodiment, as shown in FIG. 4, a width of the planar elastic part 2 gradually increases along a direction from the first connecting part 1 to the second connecting part 3, with extension lines of two sides of the planar elastic part 2 in its width direction intersecting at a point in the direction in which the first connecting part 1 faces away from the second connecting part 3 and forming an acute angle α. That is to say, the planar elastic part 2 constitutes an approximate sector shape. In one embodiment, the acute angle α is no less than 10°. Further, in a more preferred embodiment, the acute angle α is greater than 20°.

Figure 6:
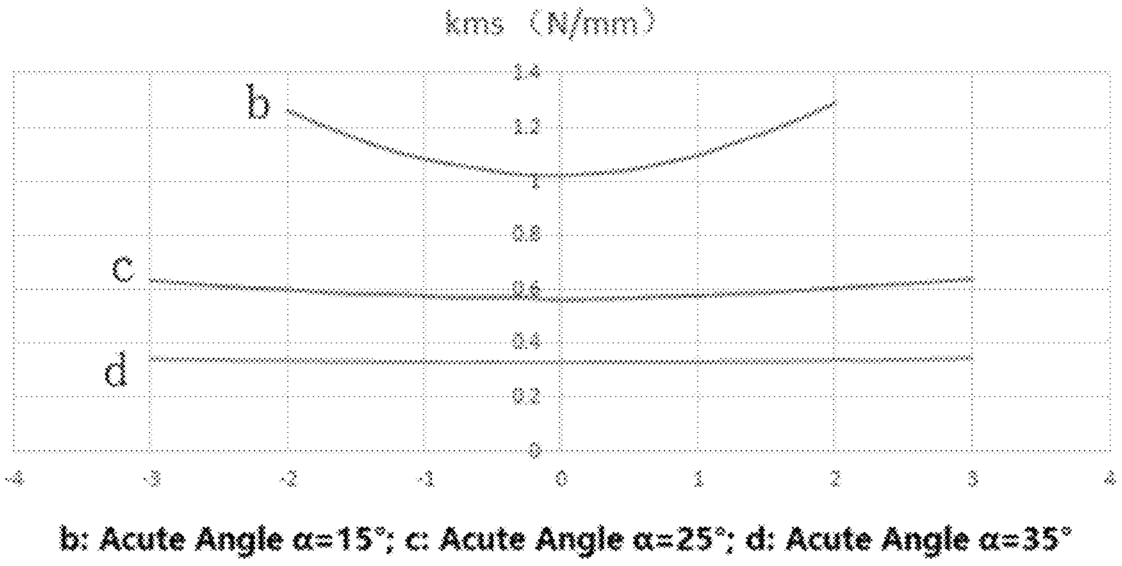
FIG. 6 is a plot of mechanical stiffness Kms values corresponding to different acute angles $\alpha$.

Through testing, it is found that the value of the acute angle α has a very significant influence on the mechanical stiffness of the damper. See FIG. 6, in the case that the other parameters remain the same, with the increasing of the acute angle α, the mechanical stiffness value Kms reduces, and the linear performance of the damper improves. The specific test data can be seen in Table 1 below:

TABLE 1

| Acute angle α | kms (N/mm) | Variation %@2 mm |
|---|---|---|
| 15° | 1.02 | 23.5% |
| 25° | 0.565 | 7% |
| 35° | 0.325 | 2% |

It can be seen from Table 1 that: when the acute angle α is 15°, the mechanical stiffness Kms of the damper is 1.02 N/mm, and the planar elastic part 2 of the damper exhibits a 23.5% variation of elastic force of when a 2 mm elastic deformation occurs; when the acute angle α is 25°, the mechanical stiffness Kms of the damper is 0.565 N/mm, and the planar elastic part 2 of the damper exhibits a 7% variation of elastic force of when a 2 mm elastic deformation occurs; when the acute angle α is 35°, the mechanical stiffness Kms of the damper is 0.325 N/mm, and the planar elastic part 2 of the damper exhibits a 2% variation of elastic force of when a 2 mm elastic deformation occurs.

In one embodiment, each bending of the planar elastic part 2 constitutes a bending track, and a number of bending tracks is no less than 3. In an embodiment, each bending of the planar elastic part constitutes a bending track; and an interval between two adjacent bending tracks is no greater than 1.5 mm. In a more preferred embodiment, every two adjacent bending tracks are equally spaced.

Figure 7:
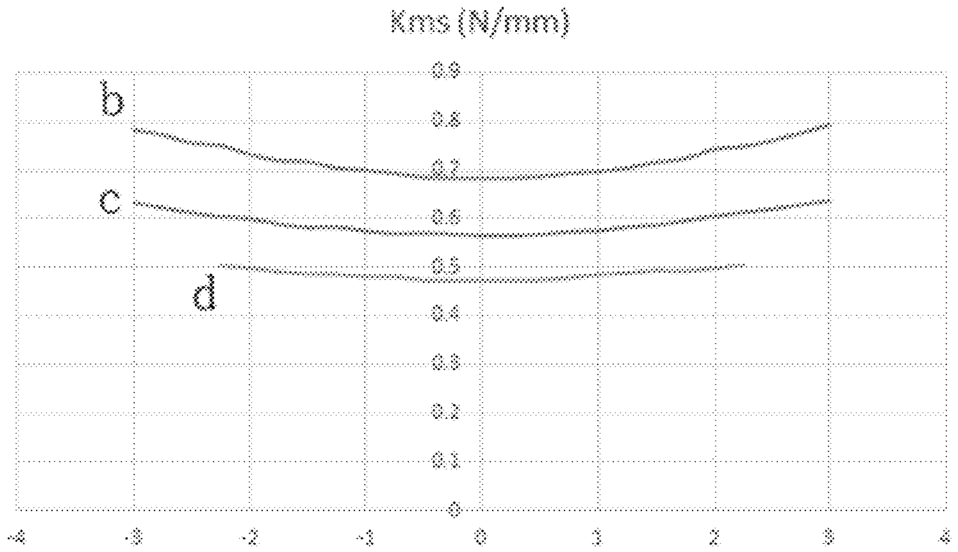
FIG. 7 is a graph of mechanical stiffness Kms values corresponding to different number of bending tracks and different intervals of the bending tracks.

Referring to FIG. 7, it is found through testing that, in the case that the other parameters remain the same, with the increasing of number of bending tracks in the planar elastic part 2, (that is, increasing number of bending), the mechanical stiffness Kms of the damper reduces, and the linear performance of the damper is better. In addition, with the reducing of the interval between the two adjacent bending tracks (that is, the bending tracks become denser), the mechanical stiffness Kms of the damper reduces, and the linear performance of the damper is better. In layman's terms, when the planar elastic part 2 of the damper has denser bending tracks and more numbers of bending tracks, the linear performance of the damper is better. The specific test data can be seen in Table 2 below:

TABLE 2

| Number of Bending Tracks/Interval | Kms (N/mm) | Variation %@2 mm |
|---|---|---|
| 8 tracks/0.4 mm | 0.473 | 5% |
| 6 tracks/0.6 mm | 0.565 | 7% |
| 4 tracks/1.1 mm | 0.683 | 8.7% |

Figure 8:
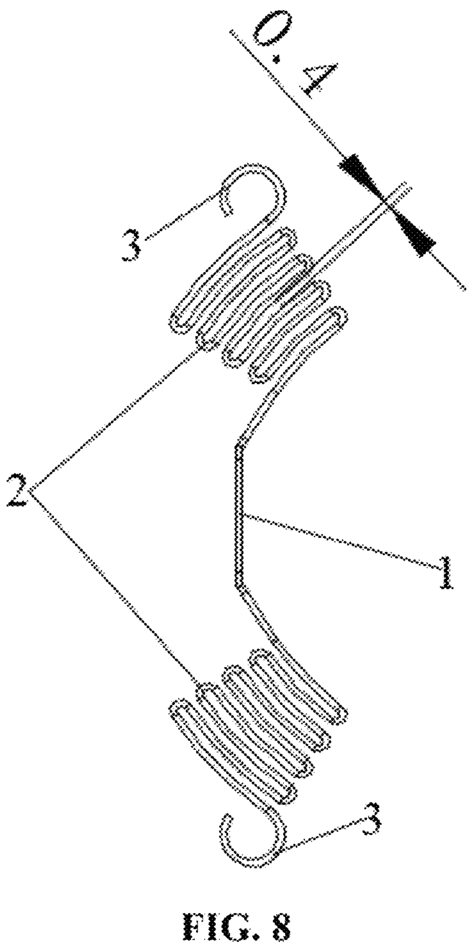
FIG. 8 is a schematic diagram of two adjacent bending tracks that are equally spaced at an interval of 0.4 mm.
Figure 9:
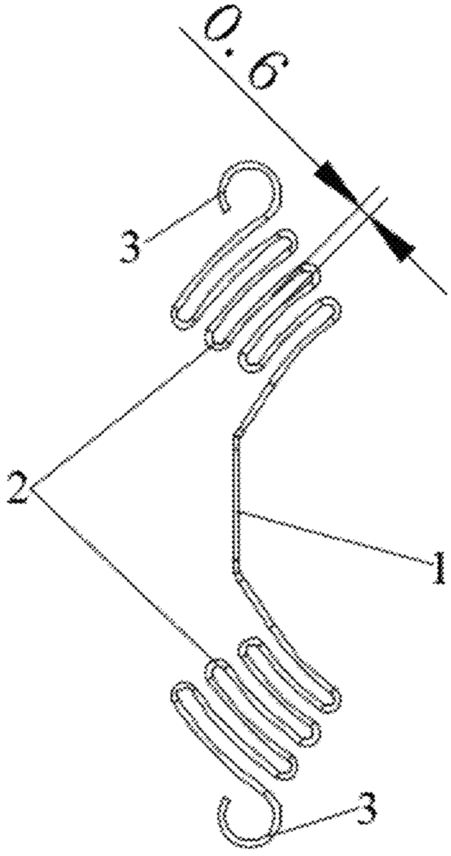
FIG. 9 is a schematic diagram of two adjacent bending tracks that are equally spaced at an interval of 0.6 mm.
Figure 10:
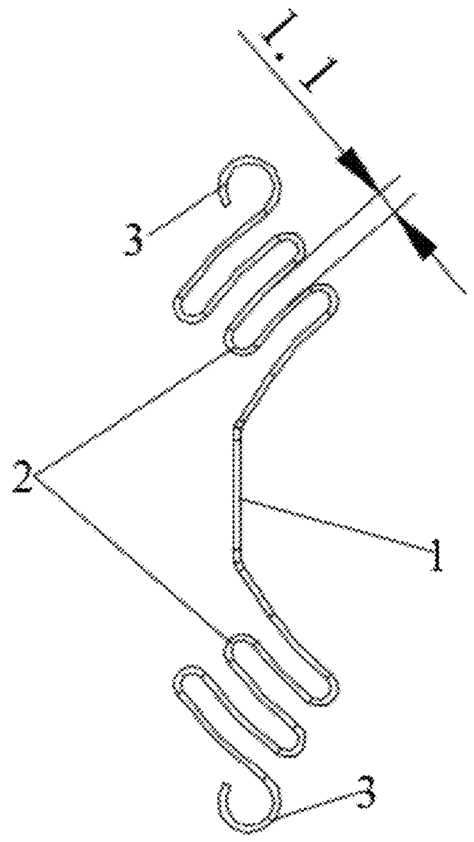
FIG. 10 is a schematic diagram of two adjacent bending tracks that are equally spaced at an interval of 1.1 mm.

It can be seen from Table 2 that: when the plane elastic part 2 is bent 8 times to form 8 bending tracks, where every two adjacent bending tracks are equally spaced at an interval of 0.4 mm (referring to FIG. 8), the mechanical stiffness Kms value of the damper is 0.473 N/mm, and the elastic force variation of the plane elastic part 2 of the damper is 5% when the elastic deformation of 2 mm occurs, corresponding to the curve d in FIG. 7; when the plane elastic part 2 is bent 6 times to form 6 bending tracks, where every two adjacent bending tracks are equally spaced at an interval of 0.6 mm (referring to FIG. 9), the mechanical stiffness Kms value of the damper is 0.565 N/mm, and the elastic force variation of the planar elastic part 2 of the damper is 7% when the elastic deformation of 2 mm occurs, which corresponds to the curve c in FIG. 7; when the plane elastic part 2 is bent 4 times to form 4 bending tracks, where every two adjacent bending tracks are equally spaced at an interval of 1.1 mm (referring to FIG. 10), the mechanical stiffness Kms value of the damper is 0.683 N/mm, and the elastic force variation of the planar elastic part 2 of the damper is 8.7% when the elastic deformation of 2 mm occurs, which corresponds to the curve b in FIG. 7.

In one embodiment, an interval between two adjacent bending tracks is greater than a wire diameter of the metal wire of the damper. In one embodiment, the wire diameter of the metal wire of the damper is 0.2 mm to 0.5 mm. In a more preferred embodiment, the wire diameter of the metal wire of the damper is 0.3 mm to 0.4 mm.

Figure 11:
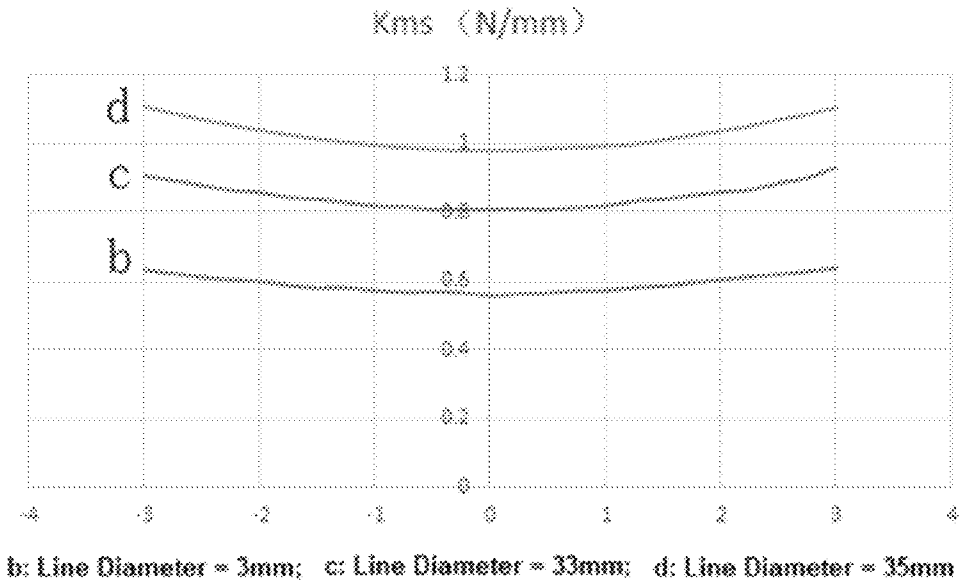
FIG. 11 is a graph of mechanical stiffness Kms values corresponding to different wire diameters.

Referring to FIG. 11, it is found through testing that the wire diameter of the metal wire constituting the damper has a very significant influence on the mechanical stiffness of the damper. In the case that the other parameters remain the same, an increased wire diameter causes the corresponding mechanical stiffness Kms to increase, thereby degrading the linear performance of the damper. However, variation of the linear performance is not significant. Considering the overall strength of the damper, a too small wire diameter of the metal wire is not a choice, as a damper made of metal wire with a too small wire diameter cannot satisfy the demands on strength. Therefore, when the wire diameter of the metal wire of the damper is set to 0.3 mm to 0.4 mm, its mechanical stiffness and linear performance are guaranteed while satisfying the strength demands of the damper. The specific test data can be seen in Table 3 below:

TABLE 3

| Wire Diameter of Metal Wire | kms (N/mm) | Variation %@2 mm |
|---|---|---|
| 0.3 mm | 0.565 | 7% |
| 0.33 mm | 0.81 | 6.1% |
| 0.35 mm | 1.01 | 6.1% |

It can be seen from Table 3 that, when the wire diameter of the metal wire is 0.3 mm, the mechanical stiffness Kms value of the damper made of the metal wire is 0.565 N/mm, and the plane elastic part 2 of the damper shows a 7% elastic force variation when an elastic deformation of 2 mm is occurring; when the wire diameter of the metal wire is 0.33 mm, the mechanical stiffness Kms value of the damper made of the metal wire is 0.81 N/mm, and the plane elastic part 2 of the damper shows a 6.1% elastic force variation when an elastic deformation of 2 mm is occurring; when the wire diameter of the metal wire is 0.35 mm, the mechanical stiffness Kms value of the damper made of the metal wire is 1.01 N/mm, and the plane elastic part 2 of the damper shows a 6.1% elastic force variation when an elastic deformation of 2 mm is occurring.

In one embodiment, the first connecting part 1, the planar elastic part 2 and the second connecting part 3 are integrally formed. That is, the entire damper is wound by a metal wire and formed into a line-like shape. This forming approach is convenient for operation and processing in terms of technology.

In one embodiment, as shown in FIG. 1, there is provided one planar elastic part 2, which is formed by one end of the first connecting part 1 being bent and extending in an S shape, in this embodiment, the length of the first connecting part 1 is substantially consistent with the minimum width of the planar elastic part 2, and the size of the entire damper is relatively small.

In another embodiment, as shown in FIGS. 2 to 5, in another embodiment, there are provided two planar elastic parts 2 which are formed by both ends of the first connecting part 1 being bent and extending in an S shape respectively. In this embodiment, the length of the first connecting part 1 is relatively long, and the two planar elastic parts 2 are symmetrically distributed at two ends of the first connecting part 1.

Figure 2:
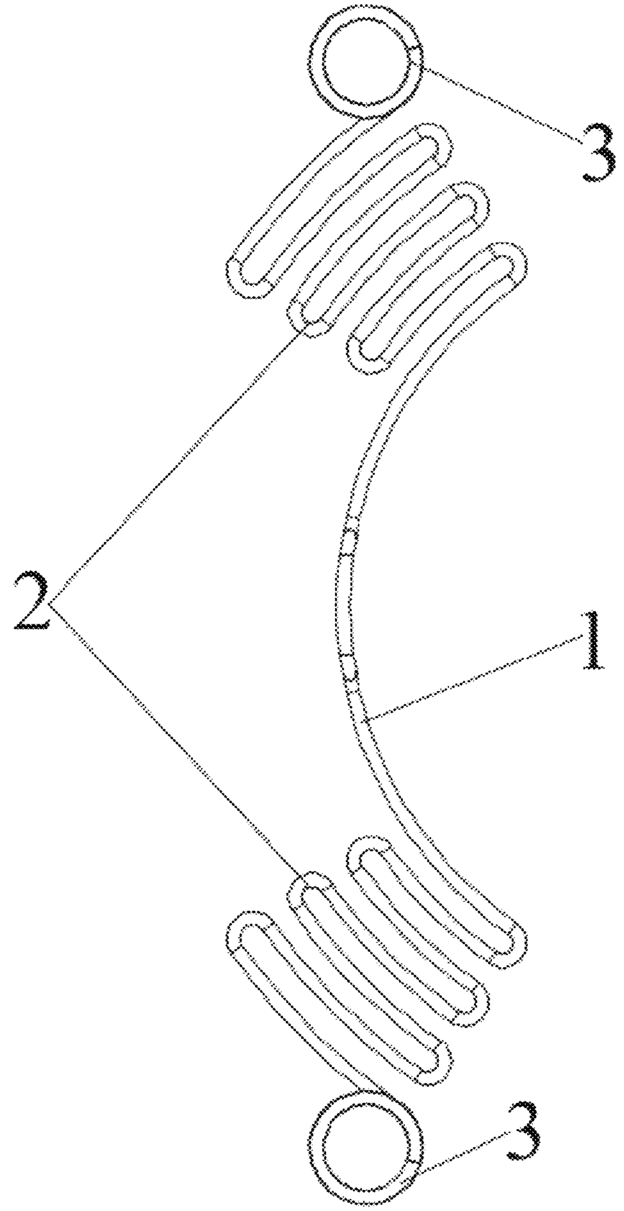
FIG. 2 is a Schematic Illustration 2 of the front view structure of a damper of the present disclosure.
Figure 3:
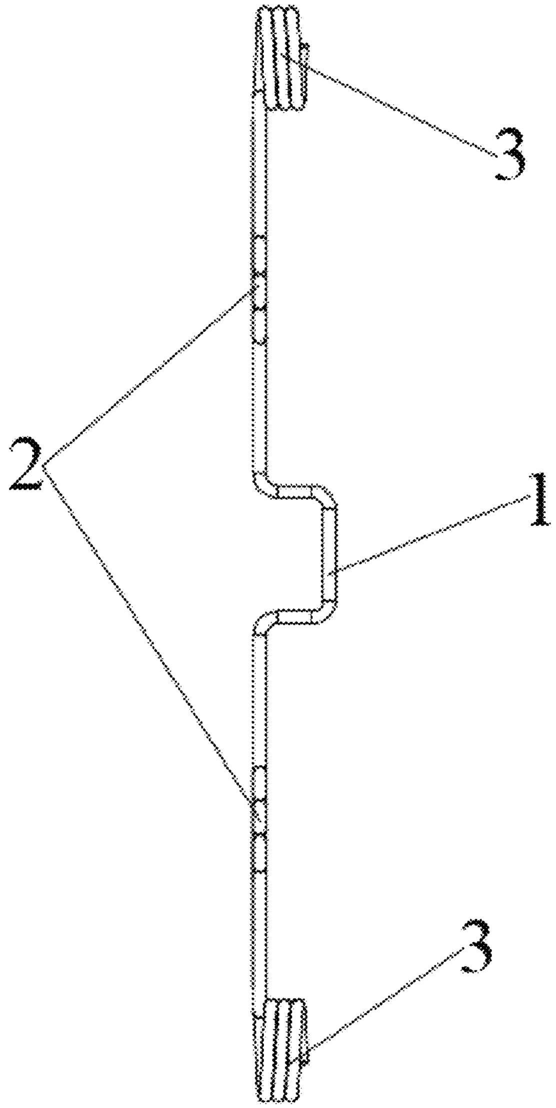
FIG. 3 is a side view of FIG. 2.

In one embodiment, as shown in FIG. 2 and FIG. 3, the first connecting part 1 is in the shape of an arc between the two planar elastic parts 2. In addition, an outwardly convex structure is formed in the middle of the first connecting part 1 to enhance the stability of connection between the damper and the voice coil of the sound-producing device.

Figure 5:
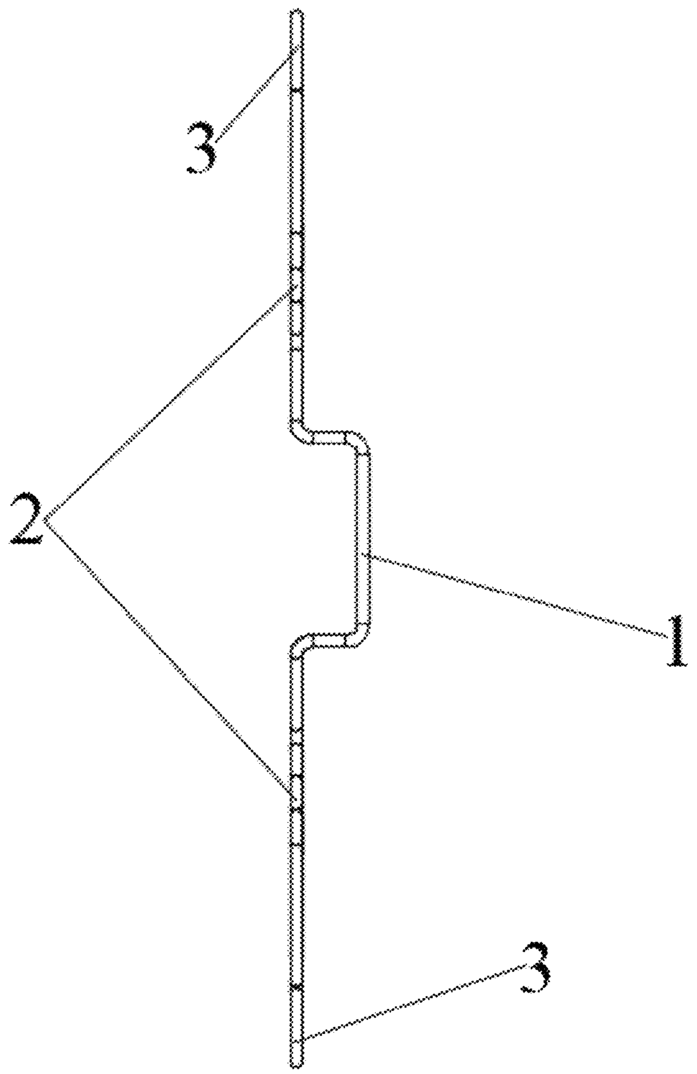
FIG. 5 is the side view of FIG. 4.

In one embodiment, as shown in FIG. 4 and FIG. 5, the first connecting part 1 is in the shape of a broken line between the two planar elastic parts 2. In addition, an outwardly convex structure is formed in the middle of the first connecting part 1 to enhance the stability of the connection between the damper and the voice coil of the sound-producing device.

In one embodiment, one end of the planar elastic part 2 away from the first connecting part 1 is bent into a hook structure to form the second connecting part 3. The number of bending loops of the hook structure may be one or at least 2. When the number of bending loops of the hook structure is at least 2, orthographic projections of the at least 2 hook structures in the vertical direction overlap. By providing a loop of hook structures, the second connecting part 3 may also be located in the same plane as the plane elastic part 2 and the first connecting part 1, so as to ensure the flatness of the product. The second connecting part 3 of the hook structure is for fixing with the sound-producing device; and increasing the number of bending turns of the hooking structure is beneficial to fix the second connecting part 3 and the sound-producing device more stably.

An embodiment of the present disclosure also provides a sound-producing device, which includes a vibration system, a magnetic circuit system and a casing. The vibration system includes a combination of a diaphragm, a voice coil, a voice coil bobbin and the damper as described above. The magnetic circuit system has a magnetic gap in which the voice coil is suspended. The casing is configured to house the vibration system and the magnetic circuit system. The voice coil is wound on the voice coil bobbin, the diaphragm is connected to one end of the voice coil bobbin, the first connecting part 1 of the damper is connected to an outer side wall of the voice coil bobbin or to a root region of the voice coil, and the second connecting part 3 of the damper is fastened to the casing.

When there is provided one planar elastic part of the damper, there will be 4 dampers in total provided in the sound-producing device. That is, there are a total of 4 planar elastic parts 2 in the sound-producing device which are symmetrically distributed with respect to the center of the voice coil. In this embodiment, you may choose to install the dampers in the root region of the voice coil.

When there are provided two planar elastic part of the damper, there will be 2 dampers provided in the sound-producing device, and the two dampers are symmetrically distributed with respect to the center of the voice coil. In this embodiment, you may choose to install the dampers on the outer side wall of the voice coil bobbin. Of course, no matter which form the damper takes, it is theoretically feasible to either install it on the outer side wall of the voice coil bobbin or to install it in the root region of the voice coil.

In recent years, a development trend of a sound-producing device such as a speaker unit is to reduce its volume, improve its sensitivity and reduce its resonant frequency F0. In order to achieve a lower resonance frequency F0, the damper in the sound-producing device needs to provide a smaller mechanical stiffness Kms, or to provide a larger vibration mass Mms. However, sensitivity of the sound-producing device will decrease when the vibration mass is increased, and thus it is a relatively straightforward and feasible way to reduce the mechanical stiffness Kms of the damper. Nevertheless, as the traditional damper is limited by its structure and material, it is very difficult to make a damper with a relatively small mechanical stiffness Kms; what is more, fatigue resistance of the damper will also degrade, causing the damper to be prone to breakage and reducing its product life.

With the damper of the present disclosure, the mechanical stiffness Kms of the damper can be adjusted by adjusting shape of the damper, wire diameter of the metal wire and other parameters. It has been verified that the damper of the present disclosure can achieve better effects. See FIG. 12 and FIG. 13, the Kms of a damper of an embodiment verified by the present disclosure is 0.56 N/mm, while the Kms of a traditional damper is 0.82 N/mm. The symmetry of the damper Kms of the present disclosure is also obviously better than that of the traditional damper. With the damper of the present disclosure is installed, the resonant frequency F0 and the total harmonic distortion THD of the sound generating device are obviously reduced.

Figure 12:
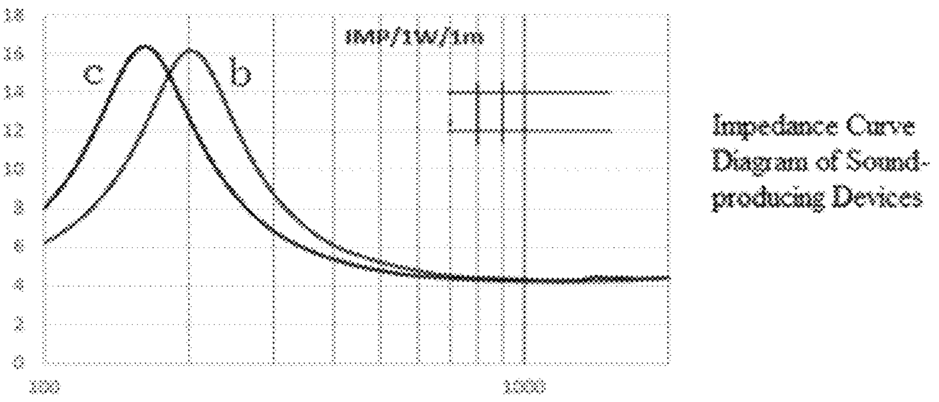
FIG. 12 is an impedance curve diagram of a sound-producing device installed with an existing damper and a sound-producing device installed with the damper of the present disclosure.

As shown in FIG. 12, a curve b shows an impedance curve corresponding to the damper in the prior art when installed in a sound-producing device; and the curve c shows an impedance curve corresponding to the damper of the embodiment of the present disclosure when installed in a sound-producing device. By comparing the curves, it can be seen that the peak of the F0 curve of the sound-producing device in curve b is around 195 Hz, while the peak of the F0 curve of the sound-producing device in curve c is around 170 Hz, that is to say, the resonant frequency F0 of the sound-producing device is lowered through use of the damper of the embodiment of the present disclosure.

Figure 13:
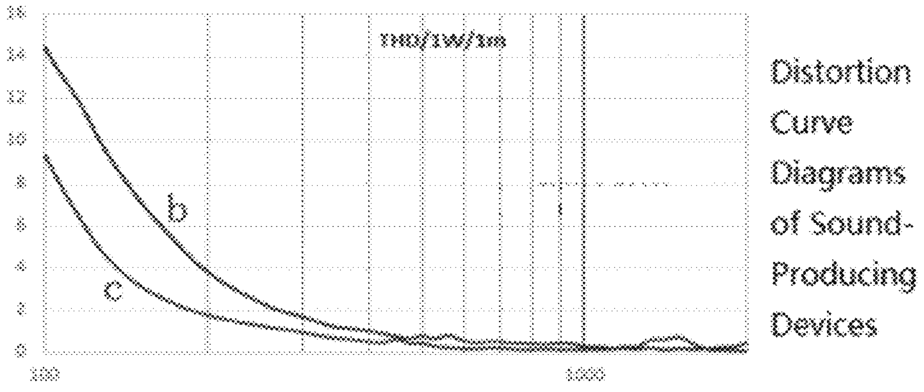
FIG. 13 is a distortion curve diagram of a sound-producing device installed with an existing damper and a sound-producing device installed with the damper of the present disclosure.

As shown in FIG. 13, curves b and c respectively show the distortion curves of the prior art damper and the damper of an embodiment of the present disclosure applied to the sound-producing device. The THD value of the damper of the embodiment of the present disclosure is lower than the THD value of the damper of the prior art, especially in the frequency range of 100-300 Hz. The damper of the present disclosure plays a major role in reducing THD: at 100 Hz frequency, the corresponding THD value in the prior art is less than 16% but greater than 14%, while the THD corresponding to the embodiment of the present disclosure is less than 10%; at 200 Hz frequency, the corresponding THD value in the prior art is less than 5%, i.e., about 4%, while the THD corresponding to the embodiment of the present disclosure is less than 2.5%, i.e., about 2%; at the frequency of 300 Hz, the corresponding THD value in the prior art is less than 2.5%, i.e., about 2%, while the THD corresponding to the embodiment of the present disclosure is less than 2%, i.e., about 1%. Therefore it can be seen that, the damper of the embodiment of the present disclosure significantly reduces either the F0 or the THD of the sound-producing device, thereby optimizing the acoustic performance of the sound-producing device.

Although the present disclosure has been described in detail in connection with some specific embodiments by way of illustration, those skilled in the art should understand that the above examples are provided for illustration only and should not be taken as a limitation on the scope of the disclosure. Those skilled in the art will appreciate that modifications may be made to the above embodiments without departing from the scope and spirit of the present disclosure. We therefore claim as our invention all that comes within the scope of the appended claims.

The invention claimed is:

1. A damper, comprising:

a first connecting part, having a first side configured to cooperatively connect to a voice coil of a sound-producing device;

a first planar elastic part, formed by a first end of the first connecting part being bent and extending toward a second side of th.e first connecting part, the planar elastic part and the first connecting part being in the same plane; and a second connecting part, connected to a second end of the first planar elastic part distal to the first connecting part, and is configured to be fixedly connected in the sound-producing device;

wherein the damper comprises a wound metal wire having line-like shape, wherein a Young's modulus of a wire rod of the metal wire is 0.7e11 pa to 3e11 pa, and a mechanical stiffness Kms of a wire rod of the metal wire is 0.2 N/mm to 2 N/mm.

2. The damper of claim 1, wherein a width of the first planar elastic part gradually increases along a direction from the first connecting part to the second connecting part, with extension lines of two sides of the first planar elastic part in its width direction intersecting at a point in a direction in which the first connecting part faces away from the second connecting part and forming an acute angle.

3. The damper of claim 2, wherein the acute angle is no less than 10°.

4. The damper of claim 3, wherein the acute angle is greater than 20°.

5. The damper of claim 1, wherein each bending of the first planar elastic part constitutes a bending track, and a number of bending tracks is no less than 3.

6. The damper of claim 5, wherein an interval between two adjacent bending tracks is greater than a wire diameter of the metal wire of the damper.

7. The damper of claim 6, wherein the wire diameter of the metal wire of the damper is 0.2 mm to 0.5 mm.

8. The damper of claim 7, wherein the wire diameter of the metal wire of the damper is 0.3 mm to 0.4 mm.

9. The damper of claim 1, wherein each bending of the first planar elastic part constitutes a bending track; and an interval between two adjacent bending tracks is no greater than 1.5 mm.

10. The damper of claim 9, wherein an interval between two adjacent bending tracks is greater than a wire diameter of the metal wire of the damper.

11. The damper of claim 10, wherein the wire diameter of the metal wire of the damper is 0.2 mm to 0.5 mm.

12. The damper of claim 11, wherein the wire diameter of the metal wire of the damper is 0.3 mm to 0.4 mm.

13. The damper of claim 1, wherein the first connecting part, the first planar elastic part and the second connecting part are integrally formed.

14. The damper of claim 1, further comprising a second planar elastic parts formed by the second end of the first connecting part being bent and extending in an S shape.

15. The damper of claim 14, wherein the first connecting part is in the shape of an arc between the first and second planar elastic parts.

16. The damper of claim 14, wherein the first connecting part is in the shape of a broken line between the first and second planar elastic parts.

17. The damper of claim 1, wherein one end of the second planar elastic part bent into a hook structure to form the second connecting part.

18. A sounding-producing device, comprising:

a vibration system, comprising a combination of a diaphragm, a voice coil, a voice coil bobbin and the damper of claim 1;

a magnetic circuit system having a magnetic gap in which the voice coil is suspended; and a casing, configured to house the vibration system and the magnetic circuit system;

wherein the voice coil is wound on the voice coil bobbin, the diaphragm is connected to one end of the voice coil bobbin, the first connecting part of the damper is connected to an outer side wall of the voice coil bobbin or to a root region of the voice coil, and the second connecting part of the damper is fastened to the casing.

* * * * *